US011972454B1

(12) United States Patent
Uttam et al.

(10) Patent No.: US 11,972,454 B1
(45) Date of Patent: Apr. 30, 2024

(54) ATTRIBUTION OF RESPONSE TO MULTIPLE CHANNELS

(71) Applicant: Poshmark, Inc., Redwood City, CA (US)

(72) Inventors: Ankur Uttam, Redwood City, CA (US); Barkha Saxena, Redwood City, CA (US); Gautam Michael Golwala, Sunnyvale, CA (US)

(73) Assignee: Poshmark, Inc., Redwood City, CA (US)

( * ) Notice: Subject to any disclaimer, the term of this patent is extended or adjusted under 35 U.S.C. 154(b) by 15 days.

(21) Appl. No.: 17/579,570

(22) Filed: Jan. 19, 2022

Related U.S. Application Data

(62) Division of application No. 16/894,719, filed on Jun. 5, 2020, now Pat. No. 11,263,660.

(51) Int. Cl.
| | |
|---|---|
| *G06Q 30/02* | (2023.01) |
| *G06F 17/18* | (2006.01) |
| *G06Q 30/0241* | (2023.01) |
| *G06Q 30/0242* | (2023.01) |
| *G06Q 30/0601* | (2023.01) |
| *G06F 3/04883* | (2022.01) |

(52) U.S. Cl.
CPC ......... *G06Q 30/0242* (2013.01); *G06F 17/18* (2013.01); *G06Q 30/0277* (2013.01); *G06Q 30/0641* (2013.01); *G06F 3/04883* (2013.01)

(58) Field of Classification Search
CPC .......... G06Q 30/0242; G06Q 30/0277; G06Q 30/0641; G06F 17/18
See application file for complete search history.

(56) References Cited

U.S. PATENT DOCUMENTS

| | | | | |
|---|---|---|---|---|
| 10,163,129 | B1* | 12/2018 | Agarwal | G06Q 30/0255 |
| 2019/0102797 | A1* | 4/2019 | Yang | G09F 9/00 |
| 2019/0318410 | A1* | 10/2019 | Modaresi | G06N 20/00 |

* cited by examiner

*Primary Examiner* — Scott C Anderson
(74) *Attorney, Agent, or Firm* — Brill Law Office; Jeffrey Brill

(57) ABSTRACT

Various implementations for multitouch attribution are described. One example method includes receiving a plurality of channel data associated with a first channel and second channel, determining conversion data for the first channel and the second channel using the plurality of channel data, receiving a first touch event and a second touch event associated with a first channel and a second channel, determining a first attribution for the first channel using a first touch event and the first channel data, determining a second attribution for the second channel using a second touch event and the second channel data, and determine an item conversion strategy using the first attribution and the second attribution.

12 Claims, 5 Drawing Sheets

ATTRIBUTION OF RESPONSE TO MULTIPLE CHANNELS

CROSS-REFERENCE TO RELATED APPLICATIONS

This patent application is a divisional application and claims the benefit of pending patent application Ser. No. 16/894,719, filed on Jun. 5, 2020 (now issued U.S. Pat. No. 11,263,660), which in turn claims the benefit under 35 U.S.C. § 119(e) of U.S. Provisional Patent Application Ser. No. 62/857,759, entitled "Attribution of Response to Multiple Channels," filed on Jun. 5, 2019, the entire contents of which are incorporated herein by reference.

BACKGROUND

The present disclosure relates to attribution of various responses to multiple channels.

Advertisements to purchase products are used to influence a buyer and increase the chance that they will purchase the advertised products. Many sellers spend large amounts of money advertising across a variety of different channels and mediums in order to influence buyers. This advertising can be expensive and it is difficult to determine its effectiveness.

Marketers measure the return on investment ("ROI") for the ads. The ROI for a specific user may be determined when a conversion event occurs, such as a registration, sign-up, purchase, share, etc. The marketer will identify the ROI across an aggregate of users by looking at the cost for the advertisement and the return (such as sales, downloads, registrations, etc.) from the advertisement.

Many of these advertisements are present on a variety of channels and it can be difficult to determine the influence of one channel's advertisement over another channel's advertisement when a user interacted with both advertisements on both channels. Some conventional multi touch attribution ("MTA") methods use time between touch events and conversion to determine weights of different channels and the attribution to the conversion. Other conventional MTA methods use channel effectiveness to determine the weights of different channels. However, it can be difficult to identify the effects of time and channel effectiveness across the different channels.

SUMMARY

The technology described herein provides a system and methods for attribution of responses to multiple channels. In a specific implementation, the present technology is directed towards attributing a response variable to one or more (e.g., multiple) driver variables based on an effectiveness of the driver variables and the time between a response event, such as a conversion, and a touch event. In some implementations, the touch event may be an event where a user responsible for the response event interacts with a driver variable.

According to one innovative aspect of the subject matter in this disclosure, a method for virtualization of tangible object components is described. In an example implementation, a computer-implemented method also includes receiving, using a processor of a computing device, first channel data associated with a first channel and second channel data associated with a second channel; determining, using the processor of the computing device, first conversion data for the first channel using the first channel data; determining, using the processor of the computing device, second conversion data for the second channel using the second channel data; receiving a first touch event associated with a user profile, the first touch event being associated with the first channel; receiving a second touch event associated with the user profile, the second touch event being associated with the second channel; determining, using the processor of the computing device, a first attribution for the first channel using the first touch event and the first channel data; determining, using the processor of the computing device, a second attribution for the second channel using the second touch event and the second channel data; determining, using the processor of the computing device, an item conversion strategy using the first attribution for the first channel and the second attribution for the second channel; and presenting, using a display of the computing device, the item conversion strategy and storing the first attribution of the first channel and the second attribution for the second channel.

Implementations may include one or more of the following features. The computer-implemented method where the first channel data includes one or more of an effectiveness of the first channel and a time to convert of the first channel and the second channel data includes one or more of an effectiveness of the second channel and a time to convert of the second channel. The first channel and the second channel are one or more of a social media platform, a television station, a podcast, a website, and a mobile application. The first touch event and the second touch event are one or more of viewing an advertisement, clicking a selectable link to view an advertisement, sharing a link with other computing devices, registering a profile on an application, and selecting a product listing. The first attribution is a first portion of a conversion credit assigned to the first channel based on the first touch event and the first channel data and the second attribution is a second portion of a conversion credit assigned to the second channel based on the second touch event and the second channel data. The computer-implemented method may include: determining, a probability of conversion based on the first touch event, the second touch event, the first conversion data, and the second conversion data. The computer-implemented method may include: determining, using the processor of the computing device, a future touch event associated with a third channel based on the probability of conversion and historical conversion data; and sending a selectable link to a computing device associated with the user profile, the selectable link including an embedded link that triggers the future touch event on the third channel when selected. The probability of conversion is related to a purchase of item depicted in one or more of the first touch event, the second touch event, and the future touch event.

One general aspect includes a system that also includes a processor, and a memory storing instructions that, when executed, cause the system to: receive first channel data associated with a first channel and second channel data associated with a second channel; determine first conversion data for the first channel using the first channel data; determine second conversion data for the second channel using the second channel data; receive a first touch event associated with a user profile, the first touch event being associated with the first channel; receive a second touch event associated with the user profile, the second touch event being associated with the second channel; determine a first attribution for the first channel using the first touch event and the first channel data; determine a second attribution for the second channel using the second touch event and the second channel data; and determine an item conversion strategy using the first attribution of the first channel and the second attribution of the second channel.

Implementations may include one or more of the following features. The system where the first channel data includes one or more of an effectiveness of the first channel and a time to convert of the first channel and the second channel data includes one or more of an effectiveness of the second channel and a time to convert of the second channel. The first channel and the second channel are one or more of a social media platform, a television station, a podcast, a website, and a mobile application. The first touch event and the second touch event are one or more of viewing an advertisement, clicking a selectable link to view an advertisement, sharing a link with other computing devices, registering a profile on an application, and selecting a product listing. The first attribution is a first portion of a conversion credit assigned to the first channel based on the first touch event and the first channel data and the second attribution is a second portion of a conversion credit assigned to the second channel based on the second touch event and the second channel data. The memory further stores instructions that, when executed, cause the system to: determine a probability of conversion based on the first touch event, the second touch event, the first conversion data, and the second conversion data. The memory further stores instructions that, when executed, cause the system to: determine a future touch event associated with a third channel based on the probability of conversion and historical conversion data; and send a selectable link to a computing device associated with the user profile, the selectable link including an embedded link that triggers the future touch event on the third channel when selected. The probability of conversion is related to a purchase of an item depicted in one or more of the first touch event, the second touch event, and the third touch event.

One general aspect includes a method also includes receiving first channel data associated with a first channel, the first channel data may include a historical probability of conversion for the first channel; receiving second channel data associated with a second channel, the second channel data may include a historical probability of conversion for the second channel; receiving a plurality of first channel events associated with a specific user and related to the first channel, each of the plurality of first channel events having a time of occurrence and a sub-type; receiving a plurality of second channel events associated with the specific user and related to the second channel, each of the plurality of second channel events having a time of occurrence and a sub-type determining that a conversion event occurred associated with the specific user; responsive to determining that the conversion event occurred, determining a first attribution value for the first channel by: filtering out any of the plurality of first channel events that have a time of occurrence that exceeds a specific threshold of time; calculating a probability of conversion for each of the remaining plurality of first channel events using the first channel data, the sub-type of each of the remaining plurality of first channel events, and the time of occurrence of each of the remaining plurality of first channel events; and summing the calculated probabilities of conversion for each of the remaining plurality of first channel events. The method also includes determining a second attribution value for the second channel by: filtering out any of the plurality of second channel events that have a time of occurrence that exceeds the specific threshold of time; calculating a probability of conversion for each of the remaining plurality of second channel events using the second channel data, the sub-type of each of the remaining plurality of second channel events, and the time of occurrence of each of the remaining plurality of second channel events; and summing the calculated probabilities of conversion for each of the remaining plurality of second channel events. The method also includes sending the first attribution value and the second attribution value to a computing device for display.

Implementations may include one or more of the following features. The method may include: determining a future event on the first channel that would cause the probabilities of conversion to exceed a threshold conversion value; generating a selectable link based on the future event on the first channel, where the selectable link is an embedded link to causes a display screen to navigate to a specific graphical user interface where future event can occur, responsive to the selectable link being selected; and sending the selectable link to a computing device associated with the specific user. The future event is for a view a product listing for an item and selecting the selectable link causes the computing device associated with the specific user to display the product listing of the item for the user to purchase. The future event is to create a new profile on an application and selecting the selectable link causes the computing device associated with the specific user to navigate to a webpage where the specific user can create the new profile.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The technology described herein provides a system and methods for attribution of responses to multiple channels. In a specific implementation, the present technology is directed towards attributing a response variable to one or more (e.g., multiple) driver variables based on an effectiveness of the driver variables and the time between a response event, such as a conversion, and a touch event. In some implementations, the touch event may be an event where a user responsible for the response event interacts with a driver variable.

One example of a use case is in attributing the effect of an advertisement on a user. A channel, such as a social media platform, television station, podcast, website, etc., may air an advertisement. A user viewing and/or interacting with the advertisement may be detected as a touch event. Marketers may spend money on different marketing channels to serve ads to a target audience. These ads may be in multiple formats, such as static display, dynamic display, video rich text, television, etc. A user is touched by the targeted ad when the user interacts (e.g., views, clicks, shares, registers, etc.) with the ad.

When multiple different channels provide different touches with the user in the form of advertisements, the conversion event may be based on more than the most recent touch by an advertisement, and a need exists to attribute the effect of the different touches by the different channels. Multitouch Attribution ("MTA"), as described herein, provides an attribution method across multiple channels. For example, a user may view an advertisement on Facebook™ and then a week later may click on a web advertisement inside of a browser and register as a new user for an application. Using an MTA method, the effect of both the Facebook™ advertisement and the webpage advertisement on the user can be determined and proportionally attributed out to each of the channels.

The current solution described herein uses both time and channel effectiveness to determine attribution for different channels. Using both the time dimension and the channel effectiveness dimension provides a holistic and accurate attribution methodology. As the multiple channels can be, for example, social media platforms, television stations, podcasts, websites, mobile applications, etc., determining channel attribution based on both time and channel effectiveness provides improvements in the operation of the associated technical fields.

Figure 1:
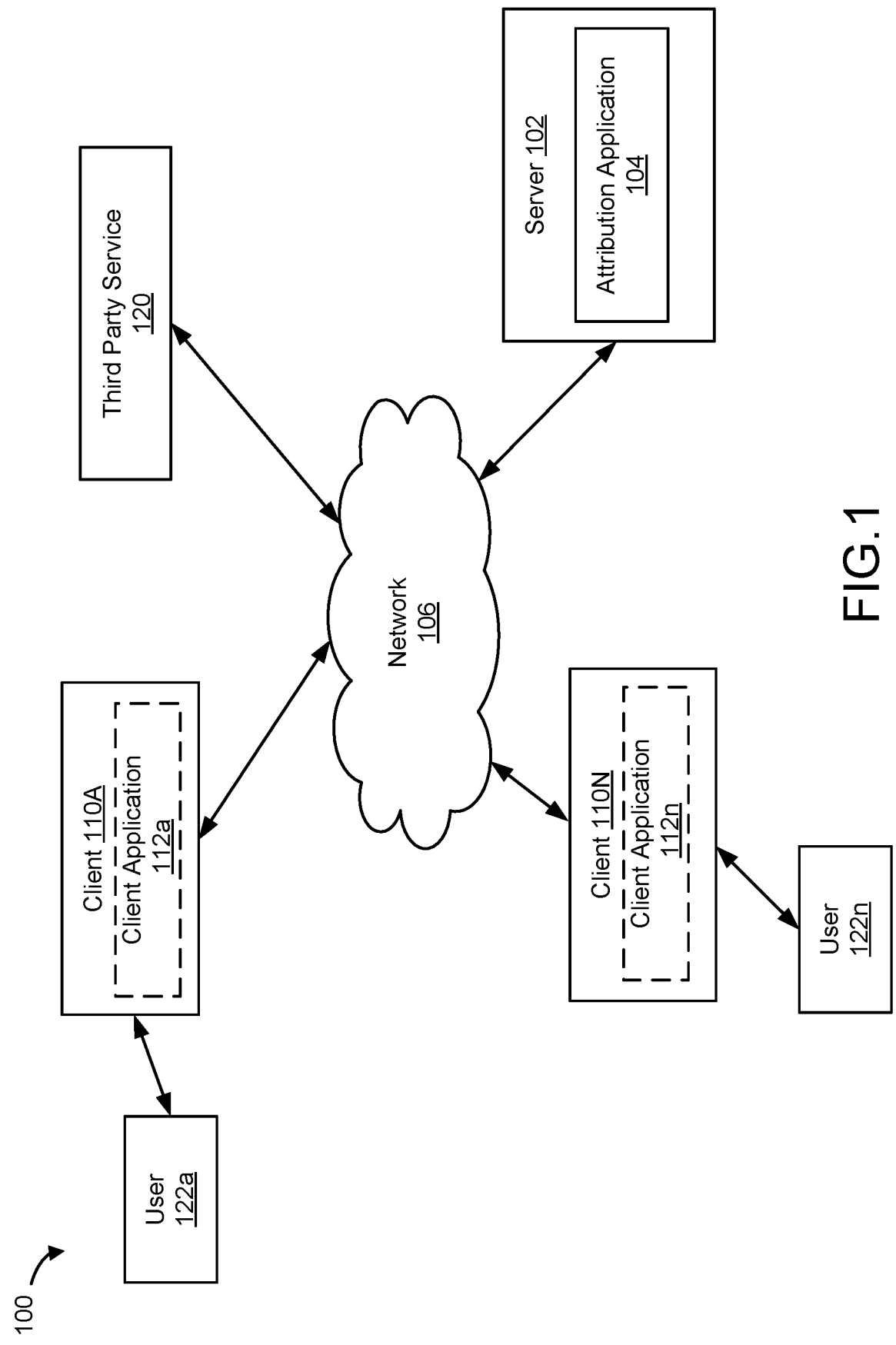
FIG. 1 is a block diagram illustrating an example system for multitouch attribution.

The technology described herein provides a system and methods for multitouch attribution. FIG. 1 is a block diagram illustrating an example system for multitouch attribution according to one implementation. The illustrated system 100 includes clients 110a . . . 110n (also referred to individually and collectively as 110), third party service 120, and server 102, which are communicatively coupled via a network 106 for interaction with one another. The use of the nomenclature "a" and "n" in the reference numbers indicates that any number of those elements having that nomenclature may be included in the system 100.

The network 106 may include any number of networks and/or network types. For example, the network 106 may include, but is not limited to, one or more wide area networks (WANs) (e.g., the Internet), local area networks (LANs), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The clients 110a . . . 110n (also referred to individually and collectively as 110) are computing devices having data processing and communication capabilities. For instance, a client 110 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.), etc. The clients 110a . . . 110n may couple to and communicate with one another and the other entities of the system 100 via the network 106 using a wireless and/or wired connection. While two clients 110 are depicted in FIG. 1, the system 100 may include any number of clients 110. In addition, the clients 110a . . . 110n may be instantiated using the same or different types of computing devices. Example clients 110 may include, but are not limited to, mobile phones (e.g., feature phones, smart phones, etc.), tablets, laptops, desktops, netbooks, smart TVs, set-top boxes, media streaming devices, portable media players, navigation devices, personal digital assistants, wearable devices, etc.

As depicted in FIG. 1, one or more of the clients 110a . . . 110n may include a client application 112a . . . 112n (also referred to individually and collectively as 112). The client application 112 may be capable of receiving information (such as requests, profile information, user data, item information, etc.) and sending that information to the server 102 via the network 106. The client application 112 may also be capable of receiving control signals via the network 106 from the server 102 that cause the client application 112 to present a graphical user interface ("GUI") on a display of the client 110. In some implementations, the client application 112 may include the drivers and other software to arrange the data received from the server 102 and/or the third-party service 120 into the GUI to present on the display. In some implementations, the GUI displayed on the client 110 may include selectable icons that have embedded links to redirect the user from the GUI to the link when the selectable icon is selected.

The third-party service 120 may include one or more applications having data processing, storing, and communication capabilities. For example, the third-party service 120 may include one or more hardware servers, server arrays, storage devices and/or systems, etc., and/or may be centralized or distributed/cloud-based. In some implementations, the third party service 120 may include one or more virtual servers, which operate in a host server environment and access the physical hardware of the host server including, for example, a processor, memory, storage, network interfaces, etc., via an abstraction layer (e.g., a virtual machine manager).

The third-party service 120 may execute software applications operable by one or more computer processors of the hardware components of the third-party service 120 to provide various computing functionalities, services, and/or resources, and to send data to and receive data from the clients 110. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the third-party service 120 is not limited to providing the above-noted services and may include other network-accessible services.

The server 102 may comprise one or more computing device(s) having data processing, storing, and communication capabilities. For example, the server 102 may include one or more hardware servers, server arrays, storage devices and/or systems, etc., and/or may be centralized or distributed/cloud-based. In some implementations, the server 102 may comprise or include one or more virtual servers, which operate in a host server environment and access the physical hardware of the host server including, for example, a processor, memory, storage, network interfaces, etc., via an abstraction layer (e.g., a virtual machine manager).

The server 102 may include software applications to provide various computing functionalities, services, and/or resources, and to send data to and receive data from the clients 110. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the server 102 is not limited to providing the above-noted services and may include other network-accessible services.

In some implementations, the server 102 may include an attribution application 104 configured to attribute conversion amounts based on touch events from multiple channels. The attribution application 104 may include software and/or logic for multitouch attribution. The attribution application 104 may receive channel data from one or more channels, such as the third-party application 120 and/or the client 110 and touch events associated with a user 122. The attribution application 104 may determine an attribution for the one or more channels.

It should be understood that the system 100 illustrated in FIG. 1 is provided by way of example, and that a variety of different system environments and configurations are contemplated and are within the scope of the present disclosure. For instance, various functionality may be moved from a server to a client, or vice versa, and some implementations may include additional or fewer clients, services, and/or networks, and may implement various functionality client or server-side. Further, various entities of the system 100 may be integrated into a single client or server, and/or may be distributed across multiple clients and/or servers, etc.

Figure 2:
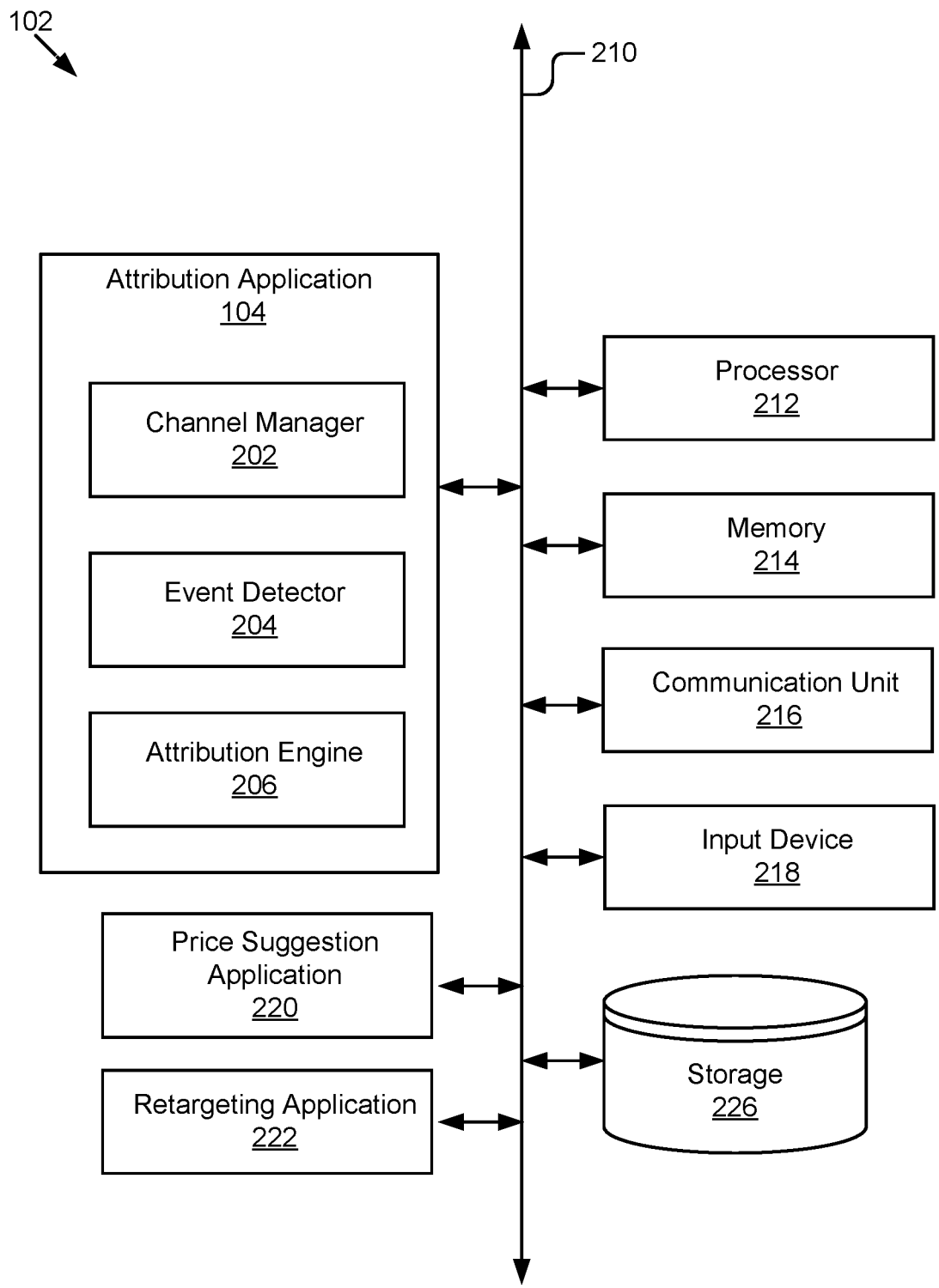
FIG. 2 is a block diagram illustrating an example computer system for multitouch attribution.

FIG. 2 is a block diagram of an example server 102. As depicted, the server 102 may include an attribution application 104, processor 212, memory 214, communication unit 216, input device 218, price suggestion application 220, retargeting application 222, and storage 226 which are communicatively coupled by a communications bus 210. However, it should be understood that the server 102 is not limited to such, and may include more, fewer, and/or different elements, including, for example, those discussed with reference to the server 102 in FIG. 1.

The processor 212 may execute software instructions by performing various input/output, logical, and/or mathematical operations. The processor 212 has various computing architectures to process data signals including, for example, a complex instruction set computer (CISC) architecture, a reduced instruction set computer (RISC) architecture, and/or an architecture implementing a combination of instruction sets. The processor 212 may be physical and/or virtual, and may include a single core or plurality of processing units and/or cores.

The memory 214 may be in the form of a non-transitory computer-readable medium that is configured to store and provide access to data to the other elements of the server 102. In some implementations, the memory 214 may store instructions and/or data that may be executed by the processor 212. For example, the memory 214 may store the attribution application 104. The memory 214 is also capable of storing other instructions and data, including, for example, an operating system, hardware drivers, other software applications, data, etc. The memory 214 may be coupled to the bus 210 for communication with the processor 212 and the other elements of the server 102.

The communication unit 216 may include one or more interface devices (I/F) for wired and/or wireless connectivity with the network 106 and/or other devices. In some implementations, the communication unit 216 may include transceivers for sending and receiving wireless signals. For instance, the communication unit 216 may include radio transceivers for communication with the network 106 and for communication with nearby devices using close-proximity (e.g., Bluetooth®, NFC, etc.) connectivity. In some implementations, the communication unit 216 may include ports for wired connectivity with other devices. For example, the communication unit 316 may include a CAT-5 interface, Thunderbolt™ interface, FireWire™ interface, USB interface, etc. In some implementations, the communication unit 216 may be configured to receive control signals for communicating information between the attribution application 104, the database 108, and/or the client 110.

The input device 218 may include any device for inputting information into the server 102. In some implementations, the input device 218 may include one or more peripheral devices. For example, the input device 218 may include a keyboard (e.g., a QWERTY keyboard), a pointing device (e.g., a mouse or touchpad), microphone, a camera, etc.

The attribution application 104 may include one or more of a channel manager 202, event detector 204, and/or attribution engine 206. The elements 202, 204, and 206 may be communicatively coupled by the bus 210 and/or the processor 212 to one another and/or the other elements 212, 214, 216, 218, 220, 222, and/or 226 of the server 102. In some implementations, one or more of the elements 202, 204, and 206 are instantiated as sets of instructions executable by the processor 212 to provide their functionality. In some implementations, one or more of the elements 202, 204, and 206 are stored in the memory 214 of the server 102 and are accessible and executable by the processor 212 to provide their functionality. In any of the foregoing implementations, these components 202, 204, and 206 may be adapted for cooperation and communication with the processor 212 and other elements of the server 102.

The channel manager 202 may include software and/or logic for receiving channel data and determining an effectiveness for individual channels, such as by determining conversion curves for the channels. The channel manager 202 may be coupled to the communication unit 216 to send and receive control signals related to and from managing the various channels. For example, in one implementation, the channel manager 202 may receive channel data for one or more channels and may determine a conversion curve for each of the channels using the channel data.

The event detector 204 may include software and/or logic for detecting and classifying events and conversions for a specific user on a channel. The event detector 204 may be coupled to the processor 212, memory 214, and/or communication unit 216 to send and receive information to one or more clients 110. For example, the event detector 204 may receive an event instance for a specific user and in some instances may determine if the event is a conversion. In some instances, the event detector 204 may also provide the data related to the events to the attribution engine 206 for attribution to the multiple channels.

The attribution engine 206 may include software and/or logic for determining attribution to the one or more channels after receiving channel data and event data. The attribution engine 206 may be coupled to the processor 212, memory 214, and/or communication unit 216 to send and receive information to or from one or more clients 110 associated with determining attribution to multiple channels.

The price suggestion application 220 may include software and/or logic for determining a suggested price for an item after receiving channel data and event data. The price suggestion application 220 may be coupled to the processor 212, memory 214, and/or communication unit 216 to send and receive information to or from one or more clients 110 associated with determining suggested prices for various items.

The retargeting application 222 may include software and/or logic for retargeting a specific user and sending them invitations to list an item after receiving channel data and event data. The retargeting application 222 may be coupled to the processor 212, memory 214, and/or communication unit 216 to send and receive information to or from one or more clients 110 associated with different items.

The storage 226 can be a combination of software and/or hardware for storing, structuring, and providing access to data. For example, a database or other storage mechanism can be used to store, organize, and/or access information associated with channels, events, attribution, conversion curves, user profile information, and/or any other information generated, stored, and/or retrieved by the attribution application 104.

The underlying storage hardware can be in the form of electro-mechanical disks, solid state disks, RAM, memory, etc. In some implementations, the storage 226 may be or instantiated in conjunction with a distributed data store, such as a cloud-based computing and/or data storage system. In some implementations, the storage 226 may include a database management system (DBMS). For example, the DBMS could be a structured query language (SQL) DBMS. For instance, storage 226 may store data in an object-based data store or multi-dimensional tables comprised of rows and columns, and may manipulate, i.e., insert, query, update, and/or delete, data entries stored in the verification data store using programmatic operations (e.g., SQL queries and statements or those of a different database manipulation library). Additional characteristics, structure, acts, and functionality of the storage 226 are discussed elsewhere herein.

As noted above, the functionalities of the client 110, third party service 120, and/or server 102 can be implemented on other computing devices, or can be distributed between multiple computer systems, including within a cloud-based computing environment in which the functionality of the system 100 is provided as a service over a network 106. It is to be understood that although attribution application 104 is illustrated in FIG. 1 as a standalone entity, the attribution application 104 represents a collection of functionalities, which can be instantiated as a single or as multiple modules as desired. FIG. 2 illustrates a specific embodiment of an attribution application 104 in the form of specific, multiple modules which are located on server 102. In other embodiments, the functionalities of the attribution application 104 are distributed and/or instantiated in other ways.

The modules of the attribution application 104 and other components of the system 100 can be instantiated (for example as object code or executable images) within the memory 214 (e.g., RAM, ROM, flash memory) of any computing device, such that when the processor 212 of the computing device processes a module, the computing device 102 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the attribution application 104 and other components of the system 100 can be stored on computer-readable storage media. Any form of tangible computer readable storage medium can be used in this context, such as magnetic, solid state, or optical storage media. As used herein, the term "computer readable storage medium" does not mean an electrical signal separate from an underlying physical medium.

Figure 3:
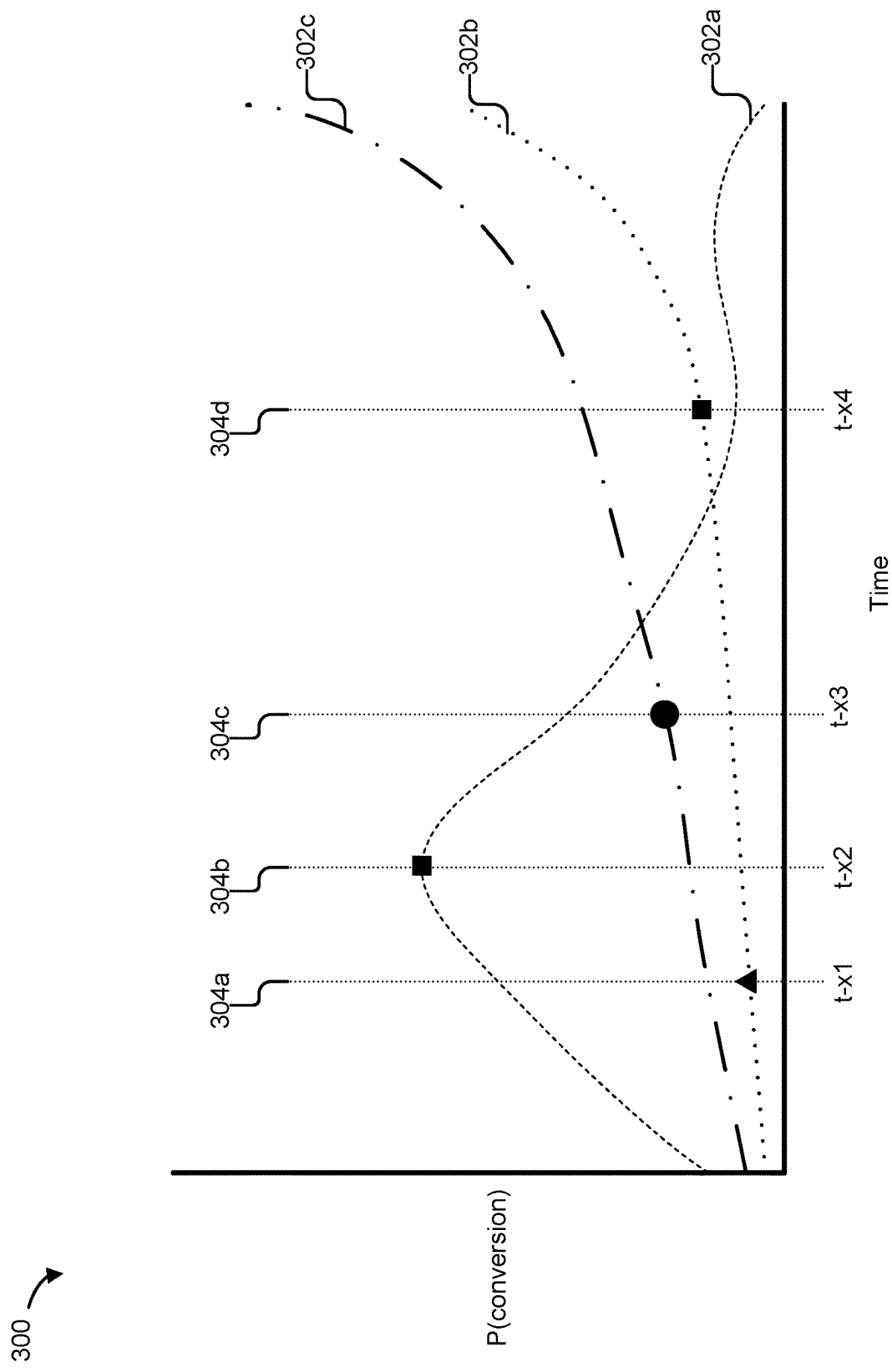
FIG. 3 is a graphic illustrating conversion curves for multiple channels.

FIG. 3 is a graphic of an example of multiple conversion curves for attributing a conversion event to multiple channels. As shown in FIG. 3, conversion curves of channels 302a-302c represent curves for different channels, with the graph 300 representing multiple channels for conversion. The vertical axis represents a probability of conversion given an occurrence of an event. Events may include, for example, purchase of an item, registration of an account, listing items for sale, etc. The horizontal axis represents the time at which a user converts. In some implementations, the channels may represent various media, such as television, Facebook™, Instagram™, etc. In the particular example, events 304a-d are shown across the various conversion curves for different channels 302 and depicted at times t-x1 through t-x4. As shown in FIG. 3, the touch events may be different types of touch events as shown by the triangle, the circle, and the square. In further implementations, the touch events 304 may be the same across different channels. It should be understood that the touch events 304 are not limited to those shown in FIG. 3, but other touch events 304 are also contemplated. In the example, a particular user may be touched by different channels as shown by events 304. For example, channel 302a may be a social media channel, such as Facebook™, and the touch 304a may be an interaction with an advertisement, such as an active interaction or a passive interaction. Interactions may include viewing an advertisement, clicking an advertisement, opening an advertisement, sharing an advertisement, etc.

As shown in FIG. 3, different channels 302 may have different conversion curves showing a probability of conversion over time for multiple users. The conversion curves may be determined by channel behavior and channel effectiveness using data over a period of time from multiple users. In some implementations, the conversions curves are determined using only data associated with that specific channel 302, while in other implementations, the conversion curve may also include data from other channels 302 to create a multi-channel conversion curve.

In some implementations, the information for creating the conversion curves may be provided by third party partners, such as the third-party service 120. In further implementations, the information gathered may include platform specific information gathered by the server 102 and/or the client application 112. The conversion curves may show individual historic data for each channel 302. In some implementations, the data related to the events 304 may also be provided by the third-party partners and/or may include platform specific data. The attribution application 104 may determine events 304 for a specific user across multiple channels 302. In some implementations, the attribution application 104 may determine events 304 by receiving notifications when events 304 have occurred from third party service 120 or detecting the occurrence of the event 304 on various channels. The events 304 can be determined in substantially real-time as they occur or after the fact when a log of different events for a period of time is reviewed by the attribution application 104 to determine and detect events 304.

In some implementations, examples of different interactions as events 304 on channels may include viewing television, listening to a radio station, watching/listening to an influencer, such as on a social media platform, podcast, etc., clicking on an impression, watching a video (as well as the amount of time spent watching the video and how much of the video), by word of mouth (e.g., listening in a live setting, such as a party), etc. For example, if an influencer is presenting and a user registers a conversion responsive to the influencer, that conversion can by tracked, such as by having the influencer give out a promo code for the user to input during conversion, requiring the user to register at a party and then looking that up during a later conversion, etc. This process allows both real-world events/touches and digital interactions to be tracked for multitouch attribution. In another example, after a user registers as a conversion, a survey may be presented that can ask what prompted the user to register, and attribute those answers back to different channels in order to capture data in the real-world and combine that with the other events detected on various digital platforms.

In some implementations, the attribution application 104 may generate data from aggregated trends across individual channels to create the conversion curves. The attribution application 104 may then map user interactions relative to the trends, such as events 304 across the channels 302 as shown in FIG. 3. The attribution application 104 may analyze the data and detect a conversion for a user. Responsive to that conversion, the attribution application 104 may attribute portions of the conversion credit (such as represented as percentages, etc.) to each of the channels 302 based on the events and the aggregated trends.

The process of collecting and sharing the data of user interactions across a channel allows for new insights. In some implementations, by collecting and analyzing the data across the different channels, a history of interactions with the user across the various channels is shown. By showing the interactions across the different channels, various trends showing how the different channels interact with each other can be identified, a feature that is not present in conventional solutions.

Figure 4:
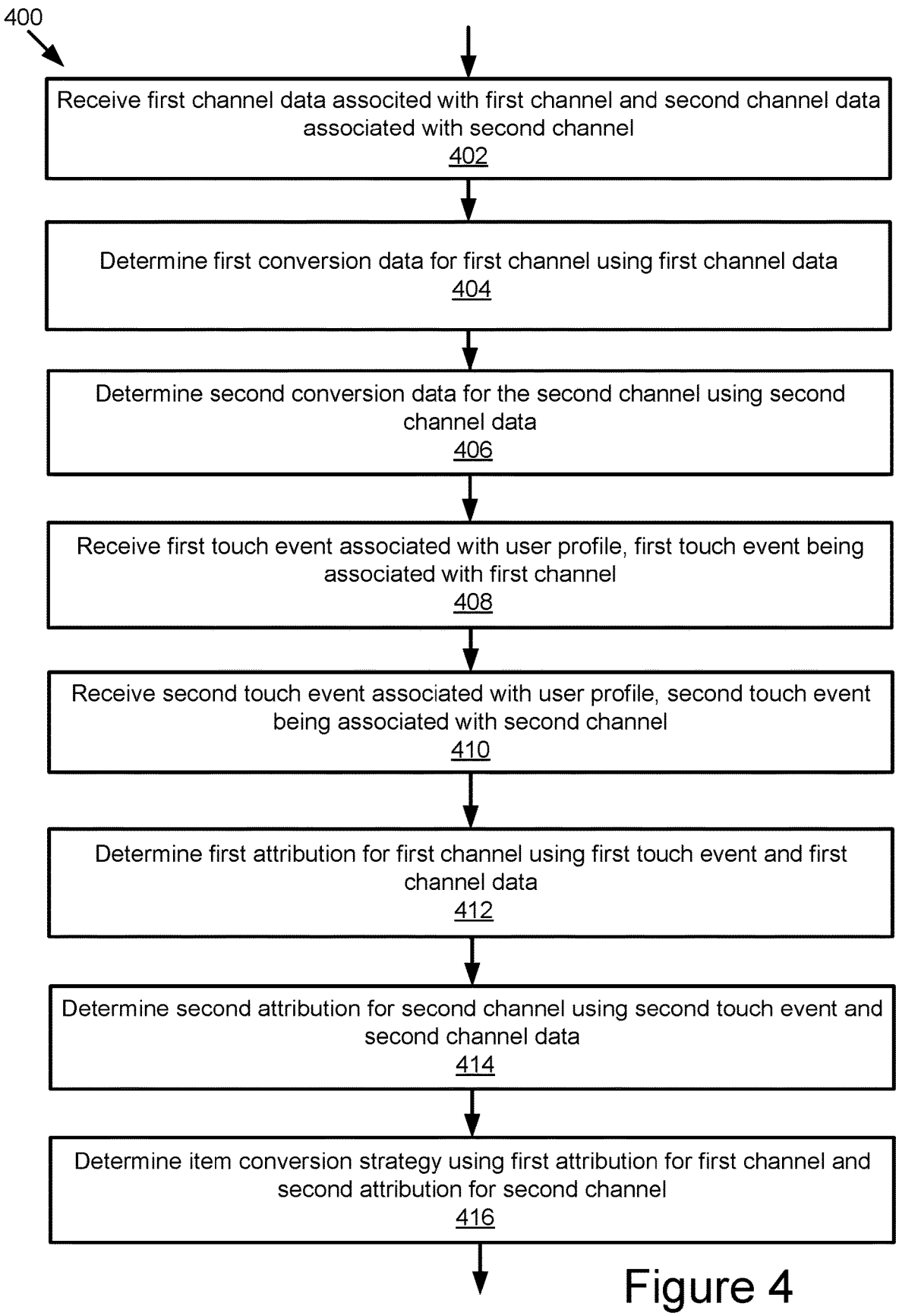
FIG. 4 is a flowchart of an example method for multitouch attribution.

FIG. 4 is a flowchart 400 illustrating an example method for multitouch attribution according to one implementation. At 402, the attribution application 104 may receive first channel data associated with a first channel and second channel data associated with a second channel. The first channel and the second channel may come from a plurality of different channels. In some implementations, the channel data may include gathering data concerning advertisements and user actions, such as those shown in the following table.

| User ID | Event Type | Event sub-type | Channel | Platform | Time of Event |
|---------|------------|----------------|---------|----------|---------------|
| 1 | Touch | Impression ($Y_1$) | Channel Ch 1 | Web ($P_1$) | $T_{1,1}$ |
| . | | Click ($Y_2$) | . | Mobile ($P_2$) | $T_{1,2}$ |
| . | | Share ($Y_3$) | . | | $T_{i,e}$ |
| . | | ... | . | | |
| N | Conversion | $T_t$ Sign Up ($Co_1$) Purchase ($Co_2$) ... $Co_v$ | Channel Ch C | | |

Where:
1 ... N → is the number that uniquely identifies each user.

Event Type → identifies the event as either a touch or a conversion.

Event Sub-Type $Y_1 \ldots Y_t$ → is the type of sub-events that are defined as a touch.

Event Sub-Type Co 1 ... Co v → is the type of sub-events that are defined as Conversion.

Ch 1 ... Ch C → channels used to touch a user.

$T_{i,j}$ → time of $j^{th}$ event for $i^{th}$ user.

For example, the below table describes events related to a user i:

| User ID | Event Type | Event sub-type | Channel | Platform | Time of Event | Days to Conversion* |
|---------|------------|----------------|---------|----------|---------------|---------------------|
| i | Touch | $Y_1$ | $Ch_1$ | $P_1$ | $T_{i,1}$ | $D_1 = T_{i,3} - T_{i,1}$ |
| i | Touch | $Y_2$ | $Ch_2$ | $P_2$ | $T_{i,2}$ | $D_2 = T_{i,3} - T_{i,2}$ |
| i | Conversion | $Co_2$ | | $P_1$ | $T_{i,3}$ | |

*Days to Conversion is null for a row that captures a conversion event
*Days to Conversion is null for a user that has not converted yet Row 1 captures the event which is a touch of type $Y_1$ through Channel $Ch_1$ on platform $P_1$ at time $T_{i,1}$ with days to conversion $D_1 = (T_{i,3} - T_{i,1})$.

Row 2 captures the event which is a touch of type $Y_2$ through Channel $Ch_2$ on platform $P_2$ at time $T_{i,2}$ with days to conversion $D_2 = (T_{i,3} - T_{i,2})$.

Row 3 captures the event which is a conversion of type $Co_2$ on platform $P_1$ at time $T_{i,3}$.

In some implementations, the data for event type touch may be captured and provided by individual channels (e.g. Google™, Facebook™) and/or third-party aggregators (such as Appsflyer™, Alphonso™, iSpot TV™). In some implementations, user identity mapping between online and offline channels is provided by third party channels.

At 404 the attribution application 104 may determine first conversion data for the first channel using the first channel data and at 406, the attribution application 104 may determine second conversion data for the second channel using the second channel data. In some implementations, the conversion data may include finding an effectiveness of individual channels by platform, touch/event types, and time to convert. The attribution application 104 may identify all users $U_{Y,Ch,P,D}$ that had only a single touch event for all unique combinations of event sub-type, channel and platform, days between touch and conversion (this is null if the user conversion did not happen). The attribution application 104 may then define an attribution window in time (such as days D). If a touch/event happens before D number of days from the conversion event, then its contribution is considered to be zero. The attribution application 104 may then define an attribution window in days D. If any touch/event happens before D number of days from the conversion event, then its contribution is considered to be zero. The attribution application 104 may then identify a subset of users $U_{Y,Ch,P,D}$ that have converted $V_{Y,Ch,P,D}$. The attribution application 104 may then calculate a conversion probability of each channel by touch/event type, platform, days to conversion as: $PR_{Y,Ch,P,D}=V_{Y,Ch,P,D}/U_{Y,Ch,P,D}$. Example conversion curves are shown in FIG. 3.

At 408, the attribution application 104 may receive a first touch event associated with a user profile and the first touch event being associated with the first channel. At 410, the attribution application 104 may receive a second touch event associated with the user profile and the second touch event being associated with the second channel. As described above, in some implementations, multiple touch events across multiple channels may be received and these touch events may be associated with the different channels on the conversion curves. In some implementations, more than one touch event may occur on the same channel at different points in time. In further implementations, the touch events may be the same across different and/or the same channels and may just occur at different points in time.

At 412, the attribution application 104 may determine a first attribution for the first channel using the first touch event and the first channel data. At 414, the attribution application 104 may determine a second attribution for a second channel using the second touch event and the second channel data. In one implementation, the attribution application 104 may attribute the conversion to individual channels where for each conversion event (K), all of the touch/events that occurred prior to conversion are identified. The attribution application 104 may filter out all events/touch that happened outside of a pre-defined attribution window and drop all touch/events that have days to conversion less than a specific time (D) and the number of remaining touch points are referred to as "n". For each of the n touch points, the attribution application 104 finds $PR_{Y,Ch,P,D}$ where Y is a touch sub-type, Ch is the channel, P is the Platform, and D is the days between touch point and conversion.

The attribution application 104 may then distribute the spend event contributor channels based on the following formula. For each channel C:

For $i^{th}$ user:

$$\text{Attributed Value}_{Ch=C} = \sum_{Y=1}^{n}(PR_{Y,Ch=C,P,D}) \Big/ \sum_{Y=1}^{n}(PR_{Y,Ch,P,D}) * \text{Value to be Distributed},$$

In some implementations, this attributed value is 0 if a user did not convert.

Figure 5:
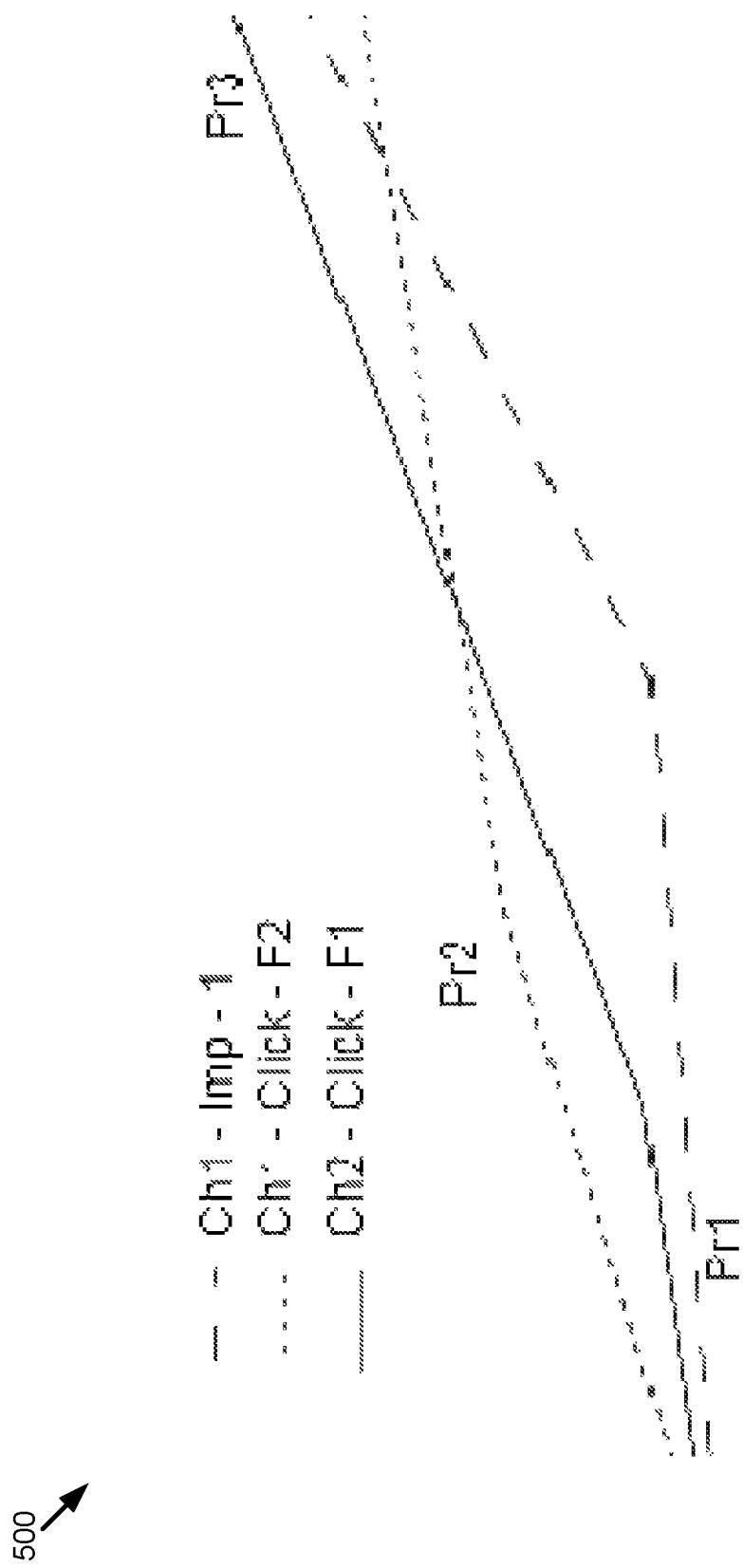
FIG. 5 is an example of probability curves for multiple channels and events.

Summing up the attributed value over all of the events gives the total attributed value to a channel:

$$\text{Attributed Value}_{Ch=C} = \sum_{i=1}^{N}(\text{Attributed Value}_{C,i})$$

Where i identifies each user.
Where $PR_{Y,Ch,P,D}$ comes from the conversion curves.
For the following examples in the below table, the conversion curves related to the table are shown in FIG. 5:

| User ID | Event Type | Event sub-type | Channel | Platform | Time of Event | Days to Conversion* |
|---|---|---|---|---|---|---|
| i | Touch | Impression | $Ch_1$ | $P_1$ | $T_{i,1}$ | $D_1 = T_{i,4} - T_{i,1}$ |
| i | Touch | Click | $Ch_1$ | $P_2$ | $T_{i,2}$ | $D_2 = T_{i,4} - T_{i,2}$ |
| i | Touch | Click | $Ch_2$ | $P_1$ | $T_{i,3}$ | $D_2 = T_{i,4} - T_{i,3}$ |
| i | Conversion | Purchase |  | $P_1$ | $T_{i,4}$ |  |

Pr1 is the probability of conversion from the Impression event on Channel 1.
Pr2 is the probability of conversion from the Click event on Channel 1.
Pr3 is the probability of conversion from the Click event on Channel 2.
If the total value of the event is V then:

Channel 1 gets $V*\{Pr1/(Pr1+Pr2+Pr3)+Pr2/(Pr1+Pr2+Pr3)\}$

Channel 2 gets $V*\{Pr3/(Pr1+Pr2+Pr3)\}$

As shown in the example 500 in FIG. 5, the Pr1 is the probability curve related to the Impression event on Channel 1. Pr2 is the probability curve related to the conversion from the Click event on Channel 1. Pr3 is the probability of conversion from the Click event on Channel 2. The probability curves are a graphical representation of the probability of an event leading to a conversion over time.

At 416, the attribution application 104 may determine an item conversion strategy using the first attribution of the first channel and the second attribution of the second channel. The attribution application 104 may also cause the first attribution of the first channel and the second attribution of the second channel to be stored for later use. The item conversion strategy may identify which channels and which events exceed a specific threshold for probability of conversion. The specific threshold may help identify which channels and which events are more likely to increase the chance that an item is converted after one or more of the touch events occur across different channels. The item conversion strategy may further identify which touch events and/or channels did not contribute, or significantly contribute, to conversion of an item and those touch events and/or channels may be identified as options for removal in a future marketing strategy. In some implementations, after determining the item conversion strategy related to a first product that was converted, the attribution application 104 may identify other products similar to the first product that have not yet been converted and provide a suggestion on a new or future touch event on a specific channel to increase the probability of conversion for the products that have not yet been converted. This is advantageous as the reasons that a specific touch event and/or channel increased a probability of conversion may be related to a timing of the conversion, such as other influences, such as cultural trends or an upcoming convention that users are searching for specific products related to the convention. By quickly identifying the item conversion strategy that was successful, similar touch events and/or channels can be recommended for marketing other similar products and increase the likelihood that a touch event on a channel will result in a conversion of the item.

In some implementations, the first attribution and the second attribution may be displayed to a user viewing the historical information from the attribution application 104. In some implementations, the attribution application 104 may generate a selectable link and embed a link to the stored first attribution of the first channel and the second attribution of the second channel within the selectable link. The attribution application 104 may then send the selectable link to one or more computing devices of different users and responsive to the user's selecting the selectable link, the first attribution and the second attribution may be viewed.

In some implementations, the attribution application 104 may retrieve the first attribution and the second attribution and may use the probability of conversion within the determined attributions to identify a future touch event associated with a channel. The future touch event may be an event that when the attribution application 104 calculates the future touch event into a future model of a probability of conversion, it causes the probability of conversion to exceed a threshold, such as a 90% probability of conversion, etc. Using this future touch event, the attribution application 104 can generate various models of potential touch events and identify which touch events and on which channels those touch events would be likely to increase the probability of conversion above a specific threshold. This allows the attribution application 104 to identify future actions that the attribution application 104 can guide the user to perform in order to increase a probability of conversion.

For example, a user may view an advertisement as a first touch event on a first channel and two days later select a link as a second touch event on a second channel. Neither of these touch events alone has resulted in a conversion, so the attribution application 104 can run a model to identify a third touch event that would cause the probability of conversion to increase. The historical probability of conversion trends across multiple channels show that a user that registers for a profile on an application and receives a discount coupon is likely to use that coupon to convert on an item they previously viewed. The attribution application 104 may identify a third channel that plays a selectable advertisement in between videos and recommend adding a coupon signup advertisement for the user that performed the first touch event and the second touch event. By using the multi-touch attribution models, the attribution application 104 can identify the third touch event and the third channel in order to target the touch event to the user. The attribution application 104 may then be able to generate a selectable link that embeds a link to the third or future touch event when interacted with by the user. For example, the attribution application 104 may send an email link to a computing device associated with the user and when the user selects the selectable link within the email, it causes the selectable link to navigate to the coupon advertisement on the third channel. In another example, the selectable link causes the computing device to navigate to a webpage where the specific user can create the user profile. Other options for the future touch event and navigating the user to the touch event using embedded links are also possible and contemplated.

In another example implementation, the multitouch attribution can be used for price suggestion, where the probability of conversion over various channels can be combined with a price determination from a price suggestion application 220 to provide a price suggestion for an item to a seller with a greater chance of causing a conversion of that item. In some implementations, the attribution application 104 can collect information related to the sale price of different items identified by the same stock-keeping unit ("SKU"). The sale price of the item identified by the SKU may be advertised across multiple channels and at multiple price points. Oftentimes, the price to advertise across the different channels can be included within a price being advertised for the item identified by the SKU, which may result in different prices for the item identified by the SKU, depending on which channels the item is advertised on. The attribution application 104 may collect the various prices of the item identified by the SKU across the various channels and include that in the channel data related to a specific item.

In some implementations, the price suggestion application 220 may then receive a request from a seller to list a specific item identified by the SKU, and the price suggestion application 220 may retrieve the various prices of the item across the different channels. The price suggestion application 220 may also determine which prices of the items identified by the SKU resulted in conversion of the item, such as a sale, as well as what touch events were attributed to the conversion of the item across the channels. The price suggestion application 220 may then present to the user listing the specific item a detailed analysis of what common prices were for the item identified by the SKU as well as which marketing strategies, e.g., which touch events on specific channels were more likely to result in conversion. The price suggestion application 220 may identify any touch events on specific channels that had a probability of conversion that exceeded specific thresholds as suggestions for the marketing strategy.

For example, a user may want to list a pair of shoes for sale. The price suggestion application 220 may identify previous prices for that pair of shoes by other sellers over the last ten days as well as which marketing channels and touch events were attributed to the conversion of that pair of shoes by other sellers, as well as the ultimate price the shoes were sold for when the conversion occurred. The price suggestion application 220 may determine that shoes that were listed for between $45 and $48 dollars and included a targeted advertisement on Facebook™ on a first day and a viewing of a video on YouTube™ a day later resulted in an 85% chance of conversion at that price point. This not only informs the user on what price to list the pair of shoes for and what strategy to employ in order to advertise for the shoes, but also how much to anticipate in spending on advertising across the two channels in order to mark-up the item to recover the costs of advertising. It informs the user on whether it is worth listing the pair of shoes based on the value of a bid and the total spend for that item identified by the SKU. In some implementations, a machine learning model can be used with the price suggestion application 220 and as additional probability curves and touch points are fed into the model, the price suggestion application 220 may improve in the suggestions and data points that are provided to a user.

In another example implementation, the multitouch attribution can be used for retargeting, where certain items are often resold at a later point in time. The retargeting application 222 may identify items based on specific SKU's and the historical trends for when those items are resold. The retargeting application 222 may incorporate the attribution application 104 and the probability of conversion across different channels to inform a user on when and how would be best to approach reselling an item they previously purchased. The retargeting application 222 can compare items from a user's purchase history to historical data of when those specific items are eventually resold. The retargeting application 222 can then identify the price of the items being resold and the most likely strategies for marketing the item across the different channels in order to result in conversion of the item.

For example, a user may have a high-end purse that they previously purchased through an online application. The retargeting application 222 may identify historical trends for other purchases of the high-end purse and determine that the high-end purse is often resold within 12-15 months after being purchased. As the window of 12-15 months from the sale date of the high-end purse to the user approaches, the retargeting application 222 can send a selectable link to the user that when selected causes the user to view various metrics related to reselling the high-end purse. The various metrics can include common resale price points for the high-end purse, how long the high-end purse is listed before being sold, and touch events across different channels that were attributed by the attribution application 104 as resulting in the conversion of the high-end purse. The retargeting application 222 can then provide suggestions for the user to interact with regarding resale of the high-end purse and strategies to employ for providing touch events to buyers across different channels and the anticipated cost of advertising on those different channels. In some implementations, the retargeting application 222 can use various machine learning algorithms to improve the suggestions and recommendations that it provides. Over time as the data sets fed into the retargeting application 222 increase the recommendations and suggestions that the retargeting application 222 returns can be further refined and improved. This allows a user to receive an even more focused and specific recommendation on when to resell and item and what marketing strategies to use.

In another example implementation, the multitouch attribution can be used to diagnose different medical conditions. For example, different symptoms can be registered as events, and where those symptoms and other data originate may represent different channels. In the example, a user's medical data may be compiled on one channel from a doctor's office, a user's prescription use history may be received from a pharmacy, a user's medical related purchases at a grocery store may be included on another channel, a user's key word searches for medical symptoms may be provided on another channel, etc. The attribution application 104 may generate historical conversion curves for each channel and the different events from the received data. After creating the curves and events, the attribution application 104 may be able to predict a conversion, such as a diagnosis for a disease, recommended next treatment, suggestion for a future health related purchase, etc. By attributing events over the multiple channels, the attribution application 104 may have a larger set of data to analyze to identify conversions, such as treatments and/or diagnosis compared to conventional diagnosing methods.

In another example implementation, the multitouch attribution can be used for fraud protection. The attribution application 104 may receive channel data from multiple channels, such as credit card history, address history, applications submitted in a user's name, etc. The attribution application 104 may identify probabilities of fraud based on conversion curves representing fraud probabilities for each channel, and based on events over the channels and the data being analyzed over the multiple channels.

In another example implementation, the multitouch attribution can be used to identify end-of-life or service requests for a machine or other technology maintenance. In this example, a machine can have maintenance records and other service information from a variety of channels. For example, a datacenter could have maintenance records for different racks as well as temperature and performance information of each of the racks. These different channels and the events of service records and daily performance data can be combined with other channels and events. The attribution application 104 may then analyze the different attribution data and provide forward looking recommendations, such as when to schedule a next maintenance, when to order a replacement part, an end-of-life estimate, etc.

In some implementations, specific events on specific channels may serve as trigger points, where the probability of those events occurring in conjunction with other data may exceed a threshold. For example, if a maintenance log indicates that a printer ran out of ink in a short period of time, and on another channel an event is detected that represents that a roller was replaced, the attribution application 104 may detect a trigger point representing an end-of-life error outside of normal expected operation. These trigger points may prompt the attribution application 104 to push out a notification to a user or automatically schedule a response based on the trigger points. Since the multitouch attribution pulls information from multiple channels that were not being used in previous implementations, new insights and trigger points can be identified. In further implementations, a machine learning component can be fed the data sets from different channels and events, and may identify additional trigger points and appropriate responses as new channel data is provided.

In some implementations, the attribution application 104 may detect inflection points on conversion curves with specific events. The attribution application 104 may use those inflection points to target future events to a user. For example, a conversion curve showing how many times a user has watched a YouTube™ advertisement and an inflection point from prior data may indicate that viewing three YouTube™ advertisements in a period of time often results in conversion. The attribution application 104 may then instruct a channel in real-time to provide additional targeted advertising based on the inflection points.

It should be understood that the above-described example use cases are provided by way of illustration and not limitation, and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the actions and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including magnetic disks, solid state disks, optical discs, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations combining such elements. For instance, the technology may be implemented in software, which can further include but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VoIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in other ways. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
receiving first channel data associated with a first channel, the first channel data comprising a historical probability of conversion for the first channel;
receiving second channel data associated with a second channel, the second channel data comprising a historical probability of conversion for the second channel;
receiving a plurality of first channel events associated with a specific user and related to the first channel, each of the plurality of first channel events having a time of occurrence and a sub-type;
receiving a plurality of second channel events associated with the specific user and related to the second channel, each of the plurality of second channel events having a time of occurrence and a sub-type;
determining that a conversion event occurred associated with the specific user;
responsive to determining that the conversion event occurred, determining a first attribution value for the first channel by:
filtering out any of the plurality of first channel events that have a time of occurrence that exceeds a specific threshold of time;
calculating a probability of conversion for each of the remaining plurality of first channel events using the first channel data, the sub-type of each of the remaining plurality of first channel events, and the time of occurrence of each of the remaining plurality of first channel events; and
summing the calculated probabilities of conversion for each of the remaining plurality of first channel events;
determining a second attribution value for the second channel by:
filtering out any of the plurality of second channel events that have a time of occurrence that exceeds the specific threshold of time;
calculating a probability of conversion for each of the remaining plurality of second channel events using the second channel data, the sub-type of each of the remaining plurality of second channel events, and the time of occurrence of each of the remaining plurality of second channel events; and
summing the calculated probabilities of conversion for each of the remaining plurality of second channel events;
sending the first attribution value and the second attribution value to a computing device for display;
feeding data sets from different channels including probability curves and channel events into a machine learning model; and
using the machine learning model to identify at least one attribution trigger point or response as new channel data is provided.

2. The method of claim 1, further comprising:
determining a future event on the first channel that would cause the probabilities of conversion to exceed a threshold conversion value;
generating a selectable link based on the future event on the first channel, where the selectable link is an embedded link to causes a display screen to navigate to a specific graphical user interface where the future event can occur, responsive to the selectable link being selected; and
sending the selectable link to a computing device associated with the specific user.

3. The method of claim 2, wherein the future event is for a view of a product listing for an item and selecting the selectable link causes the computing device associated with the specific user to display the product listing of the item for the user to purchase.

4. The method of claim 2, wherein the future event is to create a new profile on an application and selecting the selectable link causes the computing device associated with the specific user to navigate to a webpage where the specific user can create the new profile.

5. At least one non-transitory computer-readable storage medium, the at least one non-transitory computer-readable storage medium storing computer executable instructions that, when loaded into computer memory and executed by at least one processor of a computing device, cause the computing device to perform the following steps:
receiving first channel data associated with a first channel, the first channel data comprising a historical probability of conversion for the first channel;
receiving second channel data associated with a second channel, the second channel data comprising a historical probability of conversion for the second channel;
receiving a plurality of first channel events associated with a specific user and related to the first channel, each of the plurality of first channel events having a time of occurrence and a sub-type;
receiving a plurality of second channel events associated with the specific user and related to the second channel, each of the plurality of second channel events having a time of occurrence and a sub-type;
determining that a conversion event occurred associated with the specific user;
responsive to determining that the conversion event occurred, determining a first attribution value for the first channel by:
filtering out any of the plurality of first channel events that have a time of occurrence that exceeds a specific threshold of time;
calculating a probability of conversion for each of the remaining plurality of first channel events using the first channel data, the sub-type of each of the remaining plurality of first channel events, and the time of occurrence of each of the remaining plurality of first channel events; and
summing the calculated probabilities of conversion for each of the remaining plurality of first channel events;
determining a second attribution value for the second channel by:
filtering out any of the plurality of second channel events that have a time of occurrence that exceeds the specific threshold of time;
calculating a probability of conversion for each of the remaining plurality of second channel events using the second channel data, the sub-type of each of the remaining plurality of second channel events, and the time of occurrence of each of the remaining plurality of second channel events; and
summing the calculated probabilities of conversion for each of the remaining plurality of second channel events;
sending the first attribution value and the second attribution value to a computing device for display;
feeding data sets from different channels including probability curves and channel events into a machine learning model; and using the machine learning model to identify at least one attribution trigger point or response as new channel data is provided.

6. The at least one non-transitory computer-readable storage medium of claim 5, further comprising:
determining a future event on the first channel that would cause the probabilities of conversion to exceed a threshold conversion value;
generating a selectable link based on the future event on the first channel, where the selectable link is an embedded link to causes a display screen to navigate to a specific graphical user interface where the future event can occur, responsive to the selectable link being selected; and
sending the selectable link to a computing device associated with the specific user.

7. The at least one non-transitory computer-readable storage medium of claim 6, wherein the future event is for a view of a product listing for an item and selecting the selectable link causes the computing device associated with the specific user to display the product listing of the item for the user to purchase.

8. The at least one non-transitory computer-readable storage medium of claim 6, wherein the future event is to create a new profile on an application and selecting the selectable link causes the computing device associated with the specific user to navigate to a webpage where the specific user can create the new profile.

9. A computer system comprising:
system memory;
at least one processor configured to execute program code for:
receiving first channel data associated with a first channel, the first channel data comprising a historical probability of conversion for the first channel;
receiving second channel data associated with a second channel, the second channel data comprising a historical probability of conversion for the second channel;
receiving a plurality of first channel events associated with a specific user and related to the first channel, each of the plurality of first channel events having a time of occurrence and a sub-type;
receiving a plurality of second channel events associated with the specific user and related to the second channel, each of the plurality of second channel events having a time of occurrence and a sub-type;
determining that a conversion event occurred associated with the specific user;
responsive to determining that the conversion event occurred, determining a first attribution value for the first channel by:
filtering out any of the plurality of first channel events that have a time of occurrence that exceeds a specific threshold of time;
calculating a probability of conversion for each of the remaining plurality of first channel events using the first channel data, the sub-type of each of the remaining plurality of first channel events, and the time of occurrence of each of the remaining plurality of first channel events; and
summing the calculated probabilities of conversion for each of the remaining plurality of first channel events;
determining a second attribution value for the second channel by:
filtering out any of the plurality of second channel events that have a time of occurrence that exceeds the specific threshold of time;
calculating a probability of conversion for each of the remaining plurality of second channel events using the second channel data, the sub-type of each of the remaining plurality of second channel events, and the time of occurrence of each of the remaining plurality of second channel events; and
summing the calculated probabilities of conversion for each of the remaining plurality of second channel events;
sending the first attribution value and the second attribution value to a computing device for display;
feeding data sets from different channels including probability curves and channel events into a machine learning model; and
using the machine learning model to identify at least one attribution trigger point or response as new channel data is provided.

10. The computer system of claim 9, further comprising:
determining a future event on the first channel that would cause the probabilities of conversion to exceed a threshold conversion value;
generating a selectable link based on the future event on the first channel, where the selectable link is an embedded link to causes a display screen to navigate to a specific graphical user interface where the future event can occur, responsive to the selectable link being selected; and
sending the selectable link to a computing device associated with the specific user.

11. The computer system of claim 10, wherein the future event is for a view of a product listing for an item and selecting the selectable link causes the computing device associated with the specific user to display the product listing of the item for the user to purchase.

12. The computer system of claim 10, wherein the future event is to create a new profile on an application and selecting the selectable link causes the computing device associated with the specific user to navigate to a webpage where the specific user can create the new profile.

* * * * *